(No Model.)
G. KINSEY.
JAIL, PRISON, AND GRATING BAR.
No. 258,929. Patented June 6, 1882.
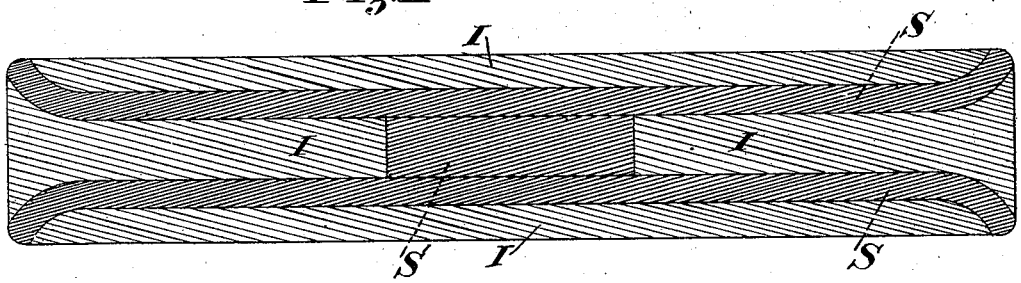
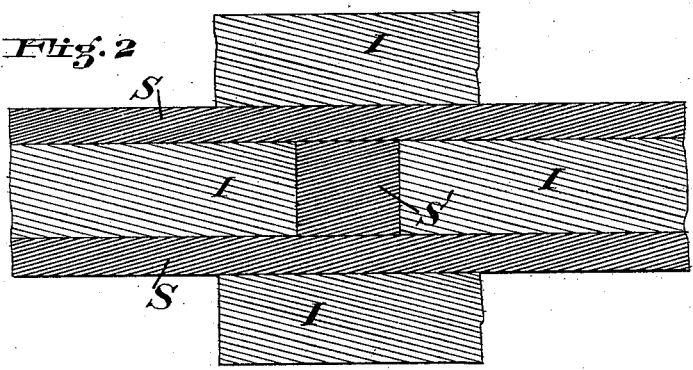
Attest
H. D. Blakmor
E. N. Parker
Inventor
George Kinsey
by Rankin D. Jones
his Atty

UNITED STATES PATENT OFFICE.

GEORGE KINSEY, OF WYOMING, OHIO.

JAIL, PRISON, AND GRATING BAR.

SPECIFICATION forming part of Letters Patent No. 258,929, dated June 6, 1882.

Application filed March 28, 1882. (No model.)

*To all whom it may concern:*

Be it known that I, GEORGE KINSEY, of Wyoming, in the county of Hamilton and State of Ohio, have invented a new and useful Improvement in Jail, Prison, and Grating Bars, which improvement is fully set forth in the following specification and accompanying drawings, in which—

Figure 1 is a cross-section of my improved flat bar. Fig. 2 shows in cross-section the method of forming the pile designed to make the improved flat bar shown and illustrated in Fig. 1.

In both drawings I represents wrought-iron, and S and S' steel.

In these bars the iron and steel are securely welded together by piling, heating, and rolling, hammering or pressing, in any of the well-known modes. The same result can be arrived at by the use of low or homogeneous steel and high steel. The word "iron" is used to represent a tough metal that cannot be hardened, and "steel" to represent a metal that can be hardened to be impervious to cutting-instruments.

While the type suggested is a convenient form for the application of the invention, it will be seen the same may be practically applied and used in the manufacture of square, rounded, or oval bars.

The bar shown in the drawings, composed of layers of steel and iron welded together in flat, round, or other desirable shape in cross-section, with outer edges of steel curved or turned at an angle, so as to meet the surface at points, has heretofore been the subject of Letters Patent, and the points of superiority of said bar have been fully set forth in said Letters Patent and are now well established in the state of the art. My present improvement relates more particularly to this class of bars with curved edges of steel meeting the surface at points. At the same time it can as well be applied to any form of bar composed of alternate layers of wrought-iron and steel.

My new improvement consists in putting in a center core or rod of steel, (see S' in the drawings, the same being in position in the pile before welding in Fig. 2, and after welding in Fig. 1.) Without this core of steel the inner or center layer of wrought-iron is capable of being bored through with a drill. After this additional core or rod of steel is inserted the bar becomes more thoroughly perfect and proof against destruction from drilling. While this flat bar is shown composed of three layers of wrought-iron and two of steel, it might be considered desirable to add more layers of both steel and iron, the bar remaining substantially the same in principle of construction so long as the said layers are alternate, in which event all and each of the central or interior layers of wrought-iron should have inserted a core or inner rod of steel, located substantially as shown in the drawings.

What I desire to claim as my invention is—

A bar composed of layers of steel and iron welded together, the inner layer or layers of iron being provided with a core or cores of steel, substantially as and for the purpose described.

GEORGE KINSEY.

Witnesses:
ROBT. J. SULLIVAN,
EMMETT N. PARKER.